J. V. HYLAND.
EGG CONTAINER.
APPLICATION FILED MAY 13, 1919.
1,323,189.
Patented Nov. 25, 1919.
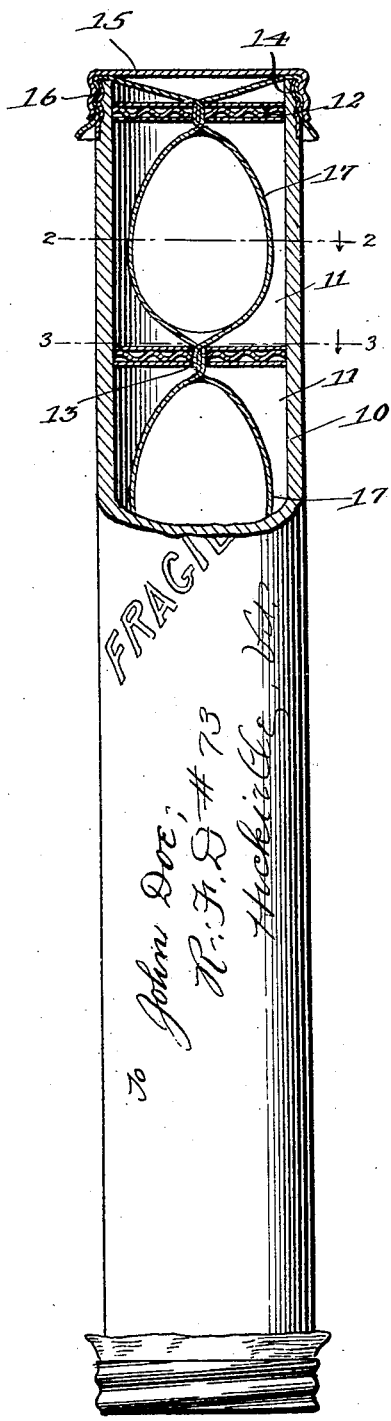
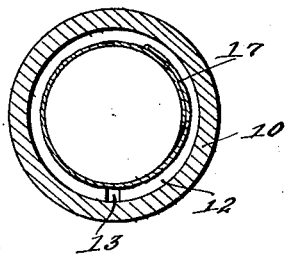
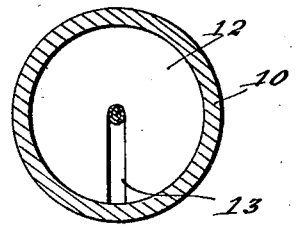
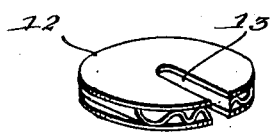
INVENTOR
J. V. Hyland,
BY Victor J. Evans
ATTY.

UNITED STATES PATENT OFFICE.

JOHN V. HYLAND, OF NEW YORK, N. Y.

EGG-CONTAINER.

1,323,189.  Specification of Letters Patent.  Patented Nov. 25, 1919.

Application filed May 13, 1919. Serial No. 296,731.

*To all whom it may concern:*

Be it known that I, JOHN V. HYLAND, residing at New York city, in the county of New York and State of New York, have invented new and useful Improvements in Egg-Containers, of which the following is a specification.

This invention relates to containers, primarily designed for the shipment or transportation of eggs, and has particular application to that class of devices wherein a tubular casing is employed, and divided into compartments by a plurality of equally spaced partitions, each of which is slotted to receive the twisted portions of the wrapping paper which supports or suspends the eggs from said partition.

The invention contemplates the provision of a device of this character wherein the opposite ends of the tubular casing are designed to accommodate screw threaded caps, and between which and the ends of the casing the edges of the wrapping paper are confined, thus permitting ready access to be had to the interior of the casing, should it be desired to inspect the contents thereof by authorized persons.

In the drawings forming part of the specification, like numerals of reference indicate similar parts in the several views and wherein:

Figure 1 is a view partly in section of the container constructed in accordance with my invention.

Fig. 2 is a transverse sectional view taken on the line 2—2 of Fig. 1.

Fig. 3 is a transverse view taken on the line 3—3 of Fig. 1.

Fig. 4 is a perspective view of one of the partitions.

Referring to the drawing in detail, 10 indicates a casing of tubular formation in cross section, which may be constructed from any suitable material preferably cardboard or the like, and of any desired length to accommodate a predetermined number of articles, such as eggs or the like. The casing 10 is divided into compartments 11 by means of the disks or partitions 12, each of which is provided with a transverse slot 13 extending from the center throughout the periphery thereof. The opposite ends of the casing 10 are reduced and threaded as shown to accommodate a metallic ferrule 14 which is designed to provide an interiorly and exteriorly arranged thread. The structure also embodies a metallic cap 15 flanged as at 16, and adapted to be threaded upon the ferrule 14.

In the use of the device, the eggs are singly placed within the casing 10, each egg being wrapped in a portion of wrapping paper or other suitable fabric 17, the latter being twisted adjacent each end of the egg. Subsequent to the wrapping of each egg, one of the partitions 12 is positioned within the casing, and the twisted portion 18 of the paper inserted in the slot 13 of said partition. This is continued until the casing is filled with eggs, and as shown in Fig. 1, the eggs are supported or suspended from the partitions 12 in spaced relation to the latter, and to the walls of the casing 10. Consequently, the eggs or other breakable articles which may be contained in the casing, can be shipped from place to place with little possibility of being broken when subjected to rough handling which packages generally receive. As illustrated, the opposite ends of the wrapping fabric 17 are extended over the adjacent ends of the casing 10 and folded against the metallic ferrule 14, so as to be confined and effectively retained therebetween and the flange 16 of the caps 15 when the latter are screwed upon the ferrules 14. Obviously this construction permits ready access to be had to the interior of the casing 10 when the occasion requires, as for instance for the purpose of inspecting the contents by postal authorities or other authorized persons. The caps 15 can be readily removed from the container and the adjacent partition removed therefrom to inspect the contents without any mutilation or other detrimental effects being sustained by the casing or the ends of the wrapping fabric, so that the parts can be readily and easily again associated to conceal the contents. It is believed that the nature and advantages of the invention will be readily apparent from the foregoing description, and what I claim is.

1. A package for the shipment of eggs, comprising a tubular casing having reduced threaded end portions, partitions movably positioned within the container and equidistantly spaced, each partition having a lateral slot opening at the periphery thereof, a fabric in which the eggs are individually wrapped and having twisted portions arranged at opposite ends of the eggs and positioned within said slots whereby said eggs are suspended from said partitions, the ends of said fabric being folded over the threaded extremities of the casing, and flanged caps screwed onto the ends of the casing and confining the ends of the fabric between said parts.

2. A package for the shipment of eggs, comprising a tubular casing having reduced threaded end portions, partitions removably positioned within the container and equidistantly spaced, each partition having a lateral slot opening at the periphery thereof, a fabric in which the eggs are individually wrapped and having twisted portions at the opposite ends of the eggs arranged in said slots whereby said eggs are suspended from said partitions, said casing being constructed of card board, a metallic ferrule threaded on the end portions of the casing, the ends of said fabric being folded over said ferrule, and caps having flanges screwed on said ferrules and confining the ends of the wrapper between said parts.

In testimony whereof I affix my signature.

JOHN V. HYLAND.